March 25, 1969     D. C. BOWMAN     3,434,219
APPARATUS FOR MEASUREMENT OF AZIMUTH
Filed March 9, 1966
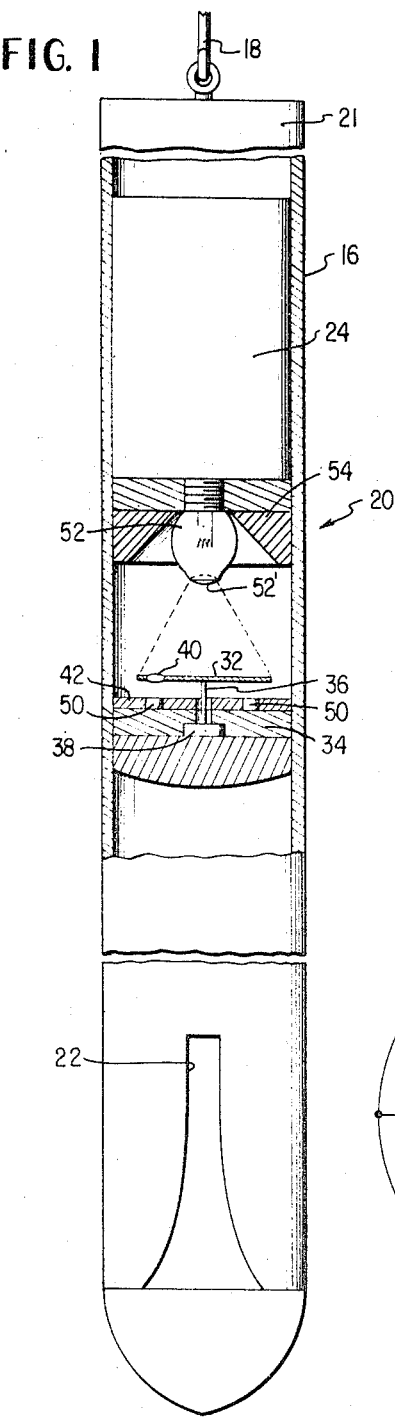
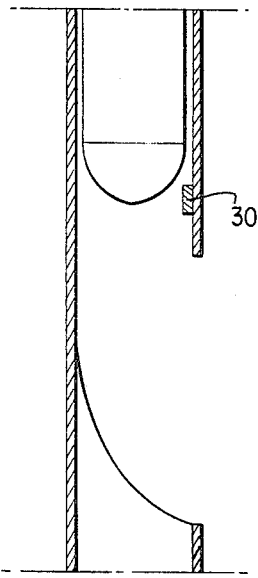
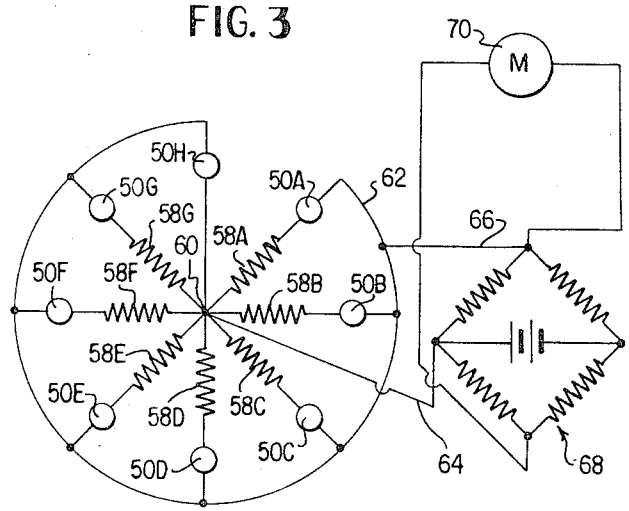
INVENTOR
DONALD C. BOWMAN
BY *McLean, Morton & Boustead*
ATTORNEYS.

United States Patent Office 3,434,219
Patented Mar. 25, 1969

3,434,219
APPARATUS FOR MEASUREMENT OF AZIMUTH
Donald C. Bowman, Tulsa, Okla., assignor, by mesne assignments, to Sinclair Research, Inc., New York, N.Y., a corporation of Delaware
Filed Mar. 9, 1966, Ser. No. 533,051
Int. Cl. E21b 47/022, 47/024
U.S. Cl. 33—205     5 Claims

ABSTRACT OF THE DISCLOSURE

An apparatus for orienting a tool within a bore hole. An instrument housing is lowered into the bore hole and contains a circular disc upon which is mounted a magnetic compass. Near the edge of the disc a small aperture is located. A light source above the disc shines through the aperture on to one of a group of photodiodes mounted at spaced positions around a circle so that as the disc orients itself under the influence of the earth's magnetic field the aperture permits light to shine on one of the photodiodes. Each photodiode is serially connected with a resistor in a bridge circuit, the values of the several resistors being different. The bridge circuit output indicates which photodiode is beneath the aperture and thus indicates the orientation of the apparatus within the bore hole.

---

This invention relates to the drilling of wells and has particular reference to apparatus for orienting a tool, for example, a whipstock designed to guide a drill in a definite direction as is necessary, for example, in straightening a crooked bore hole during drilling of wells.

As is well known, many bore holes deviate considerably from the vertical during drilling thereof. If a bore hole deviates to a substantial degree from the vertical, it may entirely miss the locality which is believed to contain oil. Accordingly, it is the practice to insert within the bore hole a whipstock having a guiding surface at an angle to the axis of the bore hole to direct the drill in the desired direction to reach its objective. Obviously, it is necessary to properly orient the whipstock to insure that a proper correction for the direction of the bore hole will be made. For this and for other reasons which are well known in the art, it may be necessary to properly orient a tool which is to be located in a predetermined azimuthal position in a bore hole.

Heretofore various types of apparatus have been proposed for carrying out this purpose which generally employ members floating on the surface of a liquid, bubbles which assume a position under a curved calibrated surface, suspended pendulous members which engage an electrochemical record disc in order to provide an indication of the position of the lower end of the pendulum at a time during which the apparatus is stationary, or the like. Other apparatus of this type heretofore used has included a photographic attachment which required taking a picture of the various instruments located at the bottom of a bore hole. All of these various devices are however, of limited application.

It is an object of the present invention to provide an improved apparatus which will operate in a bore hole having a high degree of inclination, and which will operate to provide a reliable indication of the direction of inclination of the bore hole with respect to the position of a tool affixed therein or to the lower end of a drill stem within the bore hole. The apparatus of this invention avoids the necessity of a photographic device which requires removal from the bore hole for observation and provides a device which may be used to continuously determine the direction of inclination of a bore hole or a tool.

The foregoing and other objects of the present invention will become apparent from the following description when read in conjunction with the accompanying drawings, in which FIGURE 1 is a view partially in section showing a position checking instrument in accordance with this invention;

FIGURE 2 is a partially sectional view of the position checking instrument in combination with a whipstock; and, FIGURE 3 is a diagram of the electrical circuit required for the instrument of the present invention.

Referring to FIGURE 1, the instrument designed to indicate the position of the whipstock with respect to the inclination of the bore hole is designed to be lowered into a bore hole and comprises an outer protective casing 16 carried by a line 18. Within the protective casing 16 is the instrument proper, generally designated by numeral 20. The instrument contains a magnetic compass and, consequently, it must be of non-magnetic construction to the extent of any parts which might effect the readings. The position recording instrument 20 includes an upper portion 21 which is adapted to contain a timing mechanism (not shown), if desired, such as is described in detail in the patent to Ring No. 2,559,373, issued July 3, 1951. Below the timer are batteries 27 only one of which is shown. In use, the timer is set prior to the lowering of the instrument within the drill stem in order to control the flow of current from the batteries to the illumination lamp for a predetermined recording time interval. The timer also controls the starting of this recording time interval which occurs a predetermined time after the instrument is inserted in the drill stem. Thus, by properly setting the timer, time is provided for the lowering of the instrument into position in the non-magnetic catcher and thereafter while the instrument is at rest in position within the catcher, the timer provides a predetermined period of illumination during which recording is accomplished. The complete operation of this timer is fully described in the above mentioned Ring patent. This timer as well as other timers adapted to control the flow of currents in instruments which are lowered into a bore hole are well known and need not be described in detail herein. The timer is not essential in this invention.

Below the battery-containing portion of the instrument there is provided a compass member pivotally mounted within a casing element 34 on a stem 36 supported in a jeweled bearing 38, for example. The compass member is a very lightweight, black disc 32 of a desired diameter which has attached thereto a compass needle.

This disc 32 has a single round hole near the edge thereof in which is mounted lens 40 and the disc is counterbalanced for easy turning. Beneath the disc 32 is a black circular mount 42 which has a plurality of diodes, e.g., eight, photodiodes 50 (see FIGURE 3) arranged at equal spacings about the circumference of the circle thereon coinciding with the circle traversed by lens 40 as the compass member 32 rotates. The diodes are preferably arranged at the focal point of lens 40. A light source, or sources, 52 operated by battery 24 is secured to a member 54 which is supported in the casing 16 to complete the instrument with the exception of the wiring described below. Light source 52 is a bulb having a lens 52' at the end so that the bulb throws a conical beam of light. The bulb and compass disc 32 are positioned for optimum use of light with the disc having approximately the same diameter as the cone of light. Member 54 is also provided with a reflective surface 54'.

Referring now to FIGURE 3 which illustrates a wiring diagram for the instrument of this invention the photodiodes 50 as shown include eight diodes numbered 50A, 50B, 50C . . . 50H. Each of photodiodes 50A through 50G is connected to center point 60 through a resistor 58 (resistors 58A through 58G, respectively) and each of the photodiodes 50A through 50G is also connected to a common circular electrical lead 62. Resistors 58 have different resistance values as described below. Lead 62 does not make a complete circle but connects the photodiodes from diode 50A to and including diode 50H. Diode 50H is connected directly to common point 60. Electrical lead 64 is connected to the center point 60 and electrical lead 66 is connected to the circular lead 62. Leads 64 and 66 extend up the bore hole to the surface where they are connected across a simple bridge circuit 68 to an ammeter 70. Ammeter 70 is preferably a micro ammeter, the scale of which is converted to read directly in compass direction as described below.

In operation, the instrument is lowered into the drill stem in the bore hold and comes to rest in the catcher or at the whipstock where the direction is to be measured. The casing of the instrument has a slot 22 in the side thereof which is keyed to the whipstock key 30, so that the instrument is always oriented with respect to the whipstock giving a base point from which the whipstock direction may be determined. Light source 52 is then activated by battery 24, e.g. through use of the timer described above. If desired, however, light source 52 can be operated continuously by battery 24 or by electrical leads to the surface of the ground. As the magnetic needle supported upon the compass disc 32 orients itself due to the magnetic field, as is the case under all circumstances, the opening in the member swings circularly across the series of photodiodes 50 on member 42, coming to rest when the magnetic needle is oriented. Lens 40 in the opening in member 32 collects the light from light source 52 to provide a point source of light which activates the individual photodiodes 50 as the disc moves and provides a sensitive direction indicator. The resistors 58A through 58G arranged in series with the diodes 50A through 50H (as shown in the circuit of FIGURE 3), each have different known resistances and are arranged to provide a graduated readout at the surface of the ground through the ammeter 70 to act as a direction indicator. For instance, the diode 50H which is connected straight through the circuit would give the greatest reading since it has the least resistance interconnected with it, and as the compass member 32 rotates and light through lens 40 serially activates the photodiodes 50, more resistance is added as the lens swings about center point 60 due to the resistance values of the individual resistors 58G through 58A connected to the individual photodiodes 50G through 50A. Diode 50A is at the point of most resistance. This difference in resistance which provides a graduated readout and the known spacing of the individual photodiodes about the compass center provide a direction indicator. The resistors, for example, may be picked so that between each photodiode 50 a 100 microamp deviation occurs; however, the resistance value itself is not critical but only a difference is required among the individual resistors. Of course, the number of individual photodiodes is not critical, however, the more accurate the direction required, the greater number of photodiodes required.

In actual practice, the desired position of the whipstock will have been determined from preliminary bore hole survey data. To arrange the whipstock in this position, after the whipstock is put into the bore hole, the actual azimuthal position of the whipstock is determined using the apparatus of this invention as described above. If the position is in error, the drill stem can be rotated a sufficient amount to bring the whipstock into the desired and predetermined position. It will be evident that this apparatus permits the orientation of a tool within a bore hole even when high angles of inclination exist and that this orientation may be accomplished without undue delay or difficulty in the manipulation of the position checking instrument since rotation of the whipstock can be carried out while the instrument is in position and recording the direction.

What is claimed is:

1. Apparatus for orienting a tool carried by a drill stem in a bore hole comprising an instrument housing arranged to pass through said bore hole and containing a magnetic compass including a circular disc mounted for rotation by the magnetic field, said disc having an aperture near the edge thereof, a light source in said housing, a series of photodiodes mounted at spaced positions about a circle immediately beneath said aperture in the disc whereby as the disc is rotated by the magnetic field the aperture in the disc swings circularly across the series of photodiodes, each of said photodiodes being electrically connected across a pair of leads adapted to extend up the bore hole with the connection for each said photodiode including a resistor, the resistance in the circuit for the individual photodiodes being different, and said two leads being connected across a bridge circuit including a source of current to an ammeter, whereby as said circular disc rotates in the magnetic field light passes through said aperture to selectively energize the photodiodes and produce a varying reading at said ammeter through said different resistances to act as a direction indicator.

2. Apparatus as defined in claim 1 wherein said opening in the disc has a lens therein for collecting the light produced above and focusing this light upon an individual one of said diodes.

3. Apparatus as defined in claim 2 wherein said diodes are arranged at the focal point of said lens.

4. Apparatus as defined in claim 2 wherein said light source comprises a light bulb having a lens in the end thereof adapted to throw a cone of light, said circular disc being positioned to have approximately the same diameter as said cone of light.

5. Apparatus as defined in claim 2 having eight photodiodes equally spaced about said circle.

References Cited

UNITED STATES PATENTS 2,268,256   12/1941   Knouse _____ 33—205
2,203,730   6/1940    Johnson _____ 33—205.5

LEONARD FORMAN, *Primary Examiner.*

F. J. D'AMBROSIO, *Assistant Examiner.*

U.S. Cl. X.R.

166—66; 175—45